US012798269B2

(12) United States Patent
Mori et al.

(10) Patent No.: US 12,798,269 B2
(45) Date of Patent: Nov. 17, 2026

(54) INKJET RECORDING APPARATUS

(71) Applicant: KYOCERA Document Solutions Inc., Osaka (JP)

(72) Inventors: Akihisa Mori, Osaka (JP); Nobuyuki Hayashi, Osaka (JP); Takeshi Watanabe, Osaka (JP); Kenichiro Kawasaki, Osaka (JP); Yutaka Betto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 102 days.

(21) Appl. No.: 19/097,430

(22) Filed: Apr. 1, 2025

(65) Prior Publication Data

US 2025/0313020 A1 Oct. 9, 2025

(30) Foreign Application Priority Data

Apr. 9, 2024 (JP) ................................ 2024-062753

(51) Int. Cl.

| | |
|---|---|
| ***B41J 13/08*** | (2006.01) |
| ***A46B 13/00*** | (2006.01) |
| ***A46B 13/02*** | (2006.01) |
| ***A46B 15/00*** | (2006.01) |
| ***B41J 2/165*** | (2006.01) |

(Continued)

(52) U.S. Cl.

CPC ............. *B41J 13/08* (2013.01); *A46B 13/001* (2013.01); *A46B 13/02* (2013.01); *A46B 15/0004* (2013.01); *A46B 15/0081* (2013.01); *B41J 2/16507* (2024.05); *B41J 2/17596* (2013.01); *B41J 11/0015* (2013.01); *B41J 11/0085* (2013.01); *A46B 2200/405* (2013.01); *B41J 2002/16594* (2013.01)

(58) Field of Classification Search

CPC ................ B41J 11/0015; B41J 11/0085; B41J 2/16523; B41J 11/007; B41J 13/226; A46B 15/0081; A46B 2200/405

See application file for complete search history.

(56) References Cited

U.S. PATENT DOCUMENTS

| | | | | |
|---|---|---|---|---|
| 8,477,162 | B1 * | 7/2013 | Martell | B41J 2/32 347/171 |
| 9,399,346 | B2 * | 7/2016 | Ohnishi | B41J 2/16552 |
| 2018/0236785 | A1 * | 8/2018 | Sadakuni | B41J 15/048 |

FOREIGN PATENT DOCUMENTS

| | | |
|---|---|---|
| JP | 2017-109813 A | 6/2017 |

* cited by examiner

*Primary Examiner* — Kristal Feggins
(74) *Attorney, Agent, or Firm* — Stein IP, LLC

(57) ABSTRACT

An inkjet recording apparatus has a conveyance portion conveying a sheet while electrostatically attracting it onto a conveyance belt, a recording portion having a recording head and disposed opposite the conveyance surface of the conveyance belt, a cap attached to the ink ejection surface of the recording head, a suction pump sucking the air inside the cap, an ink discharge passage, a static eliminating device, a control portion, and a foreign matter suction passage. The static eliminating device has a roll-form static eliminating brush, a brush drive motor rotating the brush forward with respect to the movement direction of the conveyance belt, a duct covering the side of the static eliminating brush opposite from the conveyance belt, and a scraper scraping off foreign matter adhering to the static eliminating brush. Through the foreign matter suction passage the duct and the suction pump communicate with each other.

5 Claims, 4 Drawing Sheets

(51) Int. Cl.

| | |
|---|---|
| ***B41J 2/175*** | (2006.01) |
| ***B41J 11/00*** | (2006.01) |

INKJET RECORDING APPARATUS

INCORPORATION BY REFERENCE

This application is based on and claims the benefit of priority from Japanese Patent Application No. 2024-62753 filed on Apr. 9, 2024, the contents of which are hereby incorporated by reference.

BACKGROUND

The present disclosure relates to an inkjet recording apparatus that records by ejecting ink from ink ejection nozzles provided in a recording head.

As recording apparatuses such as facsimiles, copiers, and printers, inkjet recording apparatuses, which eject ink from nozzles in a recording head to form images, are widely used for their capability to form high-definition images.

In such inkjet recording apparatuses, an electrostatic attraction method is known as a method for conveying a sheet used as a recording medium. In the electrostatic attraction method, a conveyance belt made of resin is electrostatically charged by a charging means, and the sheet is attracted by the electrostatic force generated by internal polarization in the sheet when it is pressed against the belt. Here, it is known that the suction force is increased through static elimination on the side of the sheet opposite from its side facing the conveyance belt (suction surface) by use of a static eliminating member such as a static eliminating brush disposed along a direction orthogonal to the conveyance direction.

Inconveniently, however, paper dust produced by the static eliminating member rubbing the sheet adheres to the nozzle surface of the recording head and clogs the nozzles, causing failure of ejection from the nozzles (missing pins) and resulting in degraded image quality.

SUMMARY

According to one aspect of the present disclosure, an inkjet recording apparatus includes a conveyance portion, a recording portion, a cap, a suction pump, an ink discharge passage, a static eliminating device, a control portion, and a foreign matter suction passage. The conveyance portion conveys a sheet while electrostatically attracting the sheet onto an endless conveyance belt. The recording portion has a recording head disposed opposite the conveyance surface of the conveyance belt and discharges ink from an ink ejection aperture in the recording head onto the sheet conveyed by the conveyance belt. The cap is attached to the ink ejection surface of the recording head and forms a hermetic space between the cap and the ink ejection surface. The suction pump sucks the air inside the cap. The ink discharge passage discharges a liquid sucked into the cap by the suction pump. The static eliminating device is disposed upstream of the recording portion with respect to the sheet conveyance direction and removes electrical charge from the sheet. The control portion controls the operation of the conveyance portion, the recording portion, the suction pump, and the static eliminating device. The static eliminating device includes a static eliminating brush, a brush drive motor, a duct, and a scraper. The static eliminating brush is in the form of a roll, is disposed opposite the conveyance belt over its entire region in the width direction orthogonal to the conveyance direction, and contacts the sheet conveyed by the conveyance belt. The brush drive motor makes the static eliminating brush rotate in the forward direction with respect to the movement direction of the conveyance belt. The duct covers the side of the static eliminating brush opposite from the conveyance belt, and sucks foreign matter produced from contact between the static eliminating brush and the sheet or the conveyance belt. The scraper protrudes from the inner surface of the duct to contact the static eliminating brush, and scrapes off the foreign matter adhering to the static eliminating brush. Through the foreign matter suction passage, the duct and the suction pump communicate with each other so that the foreign matter in the duct is collected using the suction pump and the foreign matter suction passage.

DETAILED DESCRIPTION

1. Configuration of Inkjet Recording Apparatus

Figure 1:
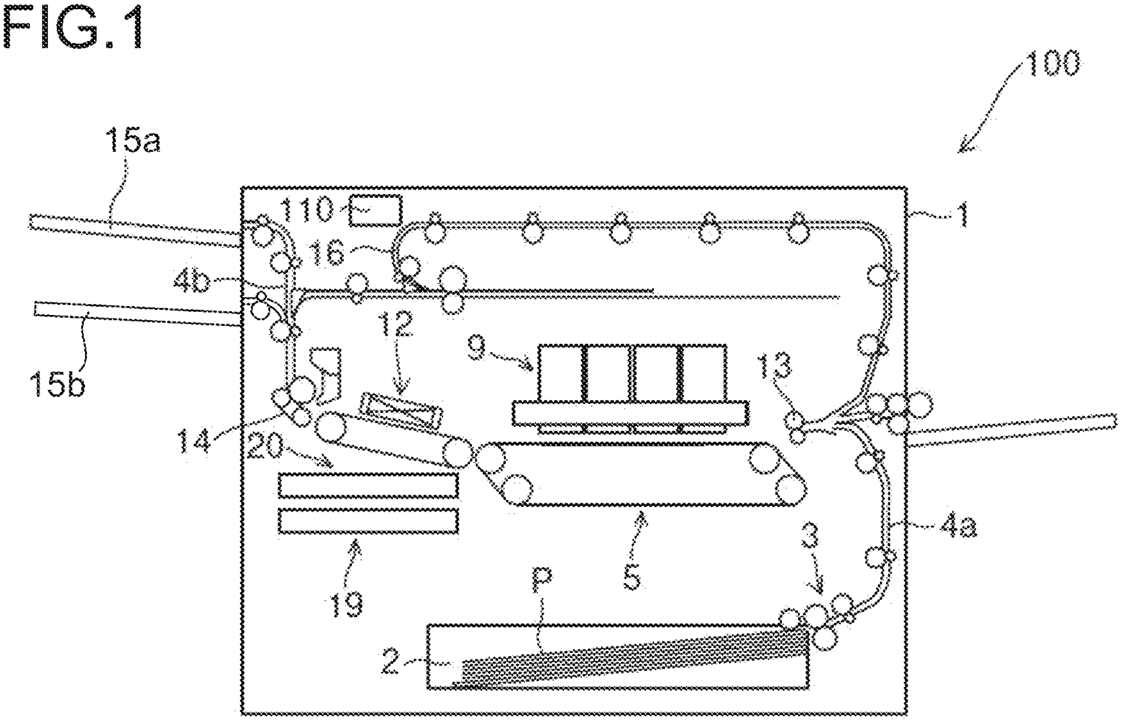
FIG. 1 is a side sectional view showing the schematic configuration of a printer as an inkjet recording apparatus according to one embodiment of the present disclosure.

An embodiment of the present disclosure will be described below with reference to the accompanying drawings. FIG. 1 is an illustrative diagram schematically showing the configuration of a printer 100 as an inkjet recording apparatus according to one embodiment of the present disclosure. The printer 100 includes a sheet feeding cassette 2 as a sheet storage portion. The sheet cassette 2 is disposed in a lower part inside a printer body 1. Sheets P as an example of a recording medium are stored in the sheet cassette 2.

A sheet feeding device 3 is disposed downstream of the sheet feed cassette 2 in the sheet conveyance direction, i.e., to the upper right of the sheet feed cassette 2 in FIG. 1. By the sheet feeding device 3, sheets P are separated and fed one sheet at a time to the upper right of the sheet feed cassette 2 in FIG. 1.

A first sheet conveyance passage **4*a* is provided inside the printer 100. The first sheet conveyance passage 4*a* is located to the upper right, i.e., in the sheet feeding direction, with respect to the sheet cassette 2. A sheet P fed out from the sheet cassette 2 is conveyed vertically upward along a side face of the printer body 1 by the first sheet conveyance passage 4*a***.

At the downstream end of the first sheet conveyance passage **4*a* with respect to the sheet conveyance direction, a pair of registration rollers 13 is provided. Furthermore, a first belt conveyance portion (conveyance portion) 5 and a recording portion 9 are disposed closely downstream of the pair of registration rollers 13. The sheet P fed out from the sheet cassette 2 passes through the first sheet conveyance passage 4*a* to reach the pair of registration rollers 13. The pair of registration rollers 13 feeds the sheet P toward the first belt conveyance portion 5 while correcting skewed feeding of the paper P and coordinating with the timing of the ink ejection operation performed by the recording portion 9**.

The paper P fed to the first conveyance portion 5 by the pair of registration rollers 13 is conveyed by the first conveyance belt 8 to a position facing the recording portion 9 (in particular, recording heads 17*a* to 17*c*, which will be described later). Ink is ejected from the recording portion 9 onto the paper P and thereby an image is recorded on the sheet P. The ejection of ink in the recording portion 9 is controlled by a control device 110 inside the printer 100.

The first belt conveyance portion 5 includes a first conveyance belt 8 (see FIG. 2) that is endless and that is wound around a first driving roller 6 and a first driven roller 7. The sheet P fed from the pair of the registration rollers 13 passes below the recording portion 9 while being electrostatically attracted to a conveyance surface 8*a* of the first conveyance belt 8.

In the sheet conveyance direction, a second belt conveyance portion 12 is disposed downstream (at left in FIG. 1) of the first conveyance portion 5. The sheet P having the image recorded on it by the recording portion 9 is fed to the second belt conveyance portion 12. The ink ejected onto the surface of the sheet P is dried while passing through the second belt conveyance portion 12.

In the sheet conveyance direction, a decurler portion 14 is provided downstream of the conveyance portion 12, near the left side face of the printer body 1. The sheet P having the ink on it dried by the second conveyance portion 12 is fed to the decurler portion 14 to correct the curl of the sheet P.

In the sheet conveyance direction, a second sheet conveyance passage 4*b* is provided downstream (above in FIG. 1) of the decurler portion 14. When duplex recording is not performed, the sheet P having passed through the decurler portion 14 passes through the second sheet conveyance passage 4*b* and is discharged to a sheet discharge tray 15*a* provided on the left side face of the printer 100, outside it. Below the sheet discharge tray 15*a*, a sub discharge tray 15*b* is provided for discharge of unnecessary sheets P (waste sheets) with printing defects or the like.

In an upper part of the printer body 1, above the recording portion 9 and the second conveyance portion 12, a reversing conveyance passage 16 is provided for duplex recording. When duplex recording is performed, the sheet P having undergone recording on its one side (first side) and having passed through the second conveyance portion 12 and the decurler portion 14 is fed through the second sheet conveyance passage 4*b* to the reversing conveyance passage 16.

The sheet P fed to the reversing conveyance passage 16 subsequently has its conveyance direction switched for recording on its other side (second side). The sheet P is then fed rightward through the upper part of the printer body 1, then passes through the pair of registration rollers 13, and is then fed back, with the second side up, to the first conveyance portion 5. In the first conveyance portion 5, the sheet P is conveyed to a position facing the recording portion 9, and an image is recorded on the second side with ink ejected from the recording portion 9. After duplex recording, the sheet P passes through the second conveyance portion 12, the decurler portion 14, and the second sheet conveyance passage 4*b* in this order and is discharged to the sheet discharge tray 15*a*.

A maintenance portion 19 and a cap unit 20 are disposed below the second conveyance portion 12. When purging is performed, the maintenance portion 19 moves horizontally to below the recording portion 9, wipes off the ink ejected out of ink ejection apertures in the recording head, and collects the ink wiped off. Purging refers to operation of forcibly pushing ink out of the ink ejection apertures in the recording head to expel thickened ink, foreign matter, and air bubbles in the ink ejection apertures. When capping the ink ejection surface of the recording head, the cap unit 20 moves horizontally to below the recording portion 9 and then moves upward to be attached to the bottom surface of the recording head.

Figure 2:
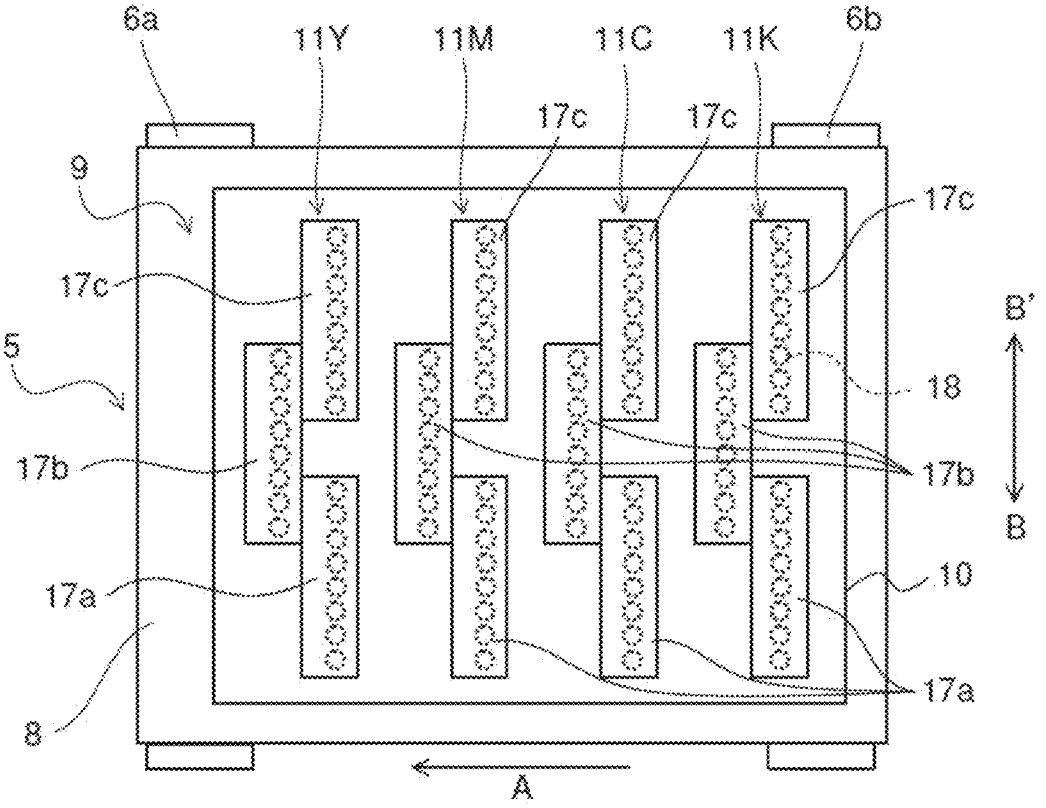
FIG. 2 is a plan view of a recording portion in the printer according to the embodiment.

FIG. 2 is a plan view of the recording portion 9. The recording portion 9 has a head housing 10 and line heads 11Y, 11M, 11C, and 11K. The line heads 11Y to 11K are held in the head housing 10 at such a height as to form a predetermined interval (e.g., 1 mm) with respect to the conveyance surface of the endless first conveyance belt 8, which is stretched around a plurality of rollers including a driving roller 6*a*, a driven roller 6*b*, and tension rollers 7*a* and 7*b* (see FIG. 3). The driving roller 6*a* runs the first conveyance belt 8 in the conveyance direction of the sheet P (arrow A direction). The driving of the drive roller 6*a* is controlled by the main control portion 110*a* (see FIG. 5) in the control device 110.

The line heads 11Y to 11K each have a plurality of (here, three) recording heads 17*a* to 17*c*. The recording heads 17*a* to 17*c* are arranged in a staggered arrangement along the sheet width direction (arrow BB' direction), which is orthogonal to the sheet conveyance direction (arrow A direction). The recording heads 17*a* to 17*c* have a plurality of ink ejection apertures 18 (nozzles). The ink ejection apertures 18 are arranged in rows at equal intervals in the width direction of the recording head, i.e., in the sheet width direction (arrow BB' direction). From the line heads 11Y to 11K, ink of the colors yellow (Y), magenta (M), cyan (C), and black (K) is ejected through the ink ejection apertures 18 in the recording heads 17A to 17C, respectively, onto the sheet P conveyed on the first conveyance belt 8.

The recording heads 17*a* to 17*c* constituting the line heads 11Y to 11K are supplied with ink of four colors (yellow, cyan, magenta, and black) stored in ink tanks (not shown) respectively.

The recording heads 17*a* to 17*c* eject ink through the ink ejection apertures 18 to the sheet P conveyed while being attracted to and held on the conveyance surface of the first conveyance belt 8 according to a control signal from the control device 110 (see FIG. 5) based on image data received from an external computer. Thus, a color image having ink of four colors, namely yellow, cyan, magenta, and black, overlaid on each other is formed on the sheet P on the first conveyance belt 8.

In the printer 100, to clean the ink ejection surfaces of the recording heads 17*a* to 17*c*, ink is pushed out of the ink ejection apertures 18 in all the recording heads 17*a* to 17*c* (purging) when printing starts after a long period of disuse and between sessions of printing operation and, with a wiper (not shown), the ink ejected onto the ink ejection surface is wiped off to perform recovery operation for the recording heads 17*a* to 17*c* in preparation for the subsequent printing operation.

2. Configuration of Static Eliminating Device and its Surroundings

Figure 3:
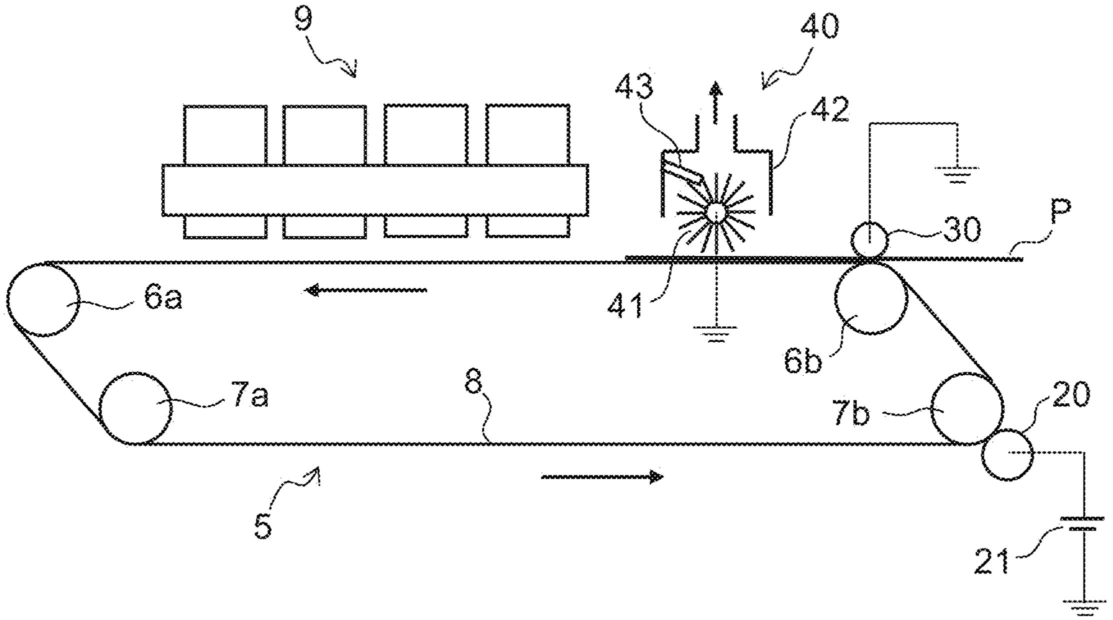
FIG. 3 is a side sectional view round a first belt conveyance portion and the recording portion in the printer according to the embodiment.

FIG. 3 is a side sectional view around the first belt conveyance portion 5 and the recording portion 9 in the printer 100.

As shown in FIG. 3, the tension roller 7*b* is in contact with a charging roller 20 via the first conveyance belt 8. An attraction voltage power supply 21 is connected to the charging roller 20. The attraction voltage power supply 21 electrostatically charges the first conveyance belt 8 by applying a predetermined voltage to the charging roller 20 based on a control signal transmitted from the sheet attraction control portion 110*b*.

Upstream of the recording portion 9 with respect to the sheet conveyance direction, at a position opposite an upstream end part of the first conveyance belt 8, an attraction roller 30 is disposed. The attraction roller 30 makes contact with, so as to rotate by following, the conveyance surface of the first conveyance belt 8 or the sheet P electrostatically attracted to and conveyed on the conveyance surface. The attraction roller 30 is grounded (earthed).

A static eliminating device 40 is disposed between the recording portion 9 and the attraction roller 30. The static eliminating device 40 has a static eliminating brush 41, a duct 42, and a scraper 43. The static eliminating brush 41 is a roll-form brush formed of an electrically conductive material. A brush drive motor 60 (see FIG. 5) is connected to the rotation shaft of the static eliminating brush 41. The static eliminating brush 41 is grounded (earthed).

When printing operation is performed, a sheet P is conveyed from the pair of registration rollers 13 to the first belt conveyance portion 5 with predetermined timing. The sheet P conveyed to the first belt conveyance portion 5 is pressed against the conveyance surface of the first conveyance belt 8 by the attraction roller 30 and then passes below the static eliminating device 40. Meanwhile, the static eliminating brush 41 contacts the sheet P while rotating in the forward direction (clockwise direction in FIG. 3) with respect to the movement direction of the first conveyance belt 8. Thus, the electric charge on the sheet P is eliminated and the sheet P is electrostatically attracted to the first conveyance belt 8.

Using a roll-form brush as the static eliminating brush 41 and rotating it in the forward direction with respect to the movement direction of the first conveyance belt 8 helps suppress the rubbing of the surface of the sheet P compared with a configuration where the static eliminating brush 41 is fixed, and it is thus possible to reduce paper dust.

The duct 42 covers a part (upper part) of the static eliminating brush 41 opposite from the first conveyance belt 8. To the duct 42, a paper dust passage 53 (see FIG. 4) is connected. The paper dust produced by contact between the static eliminating brush 41 and the sheet P passes through the paper dust suction passage 53 and is collected in a waste ink collection container 52 (see FIG. 4). The scraper 43 protrudes from the inner surface of the duct 42 and scrapes off the paper dust and the like adhering to the static eliminating brush 41 by contacting the brush part when the static eliminating brush 41 rotates.

Figure 4:
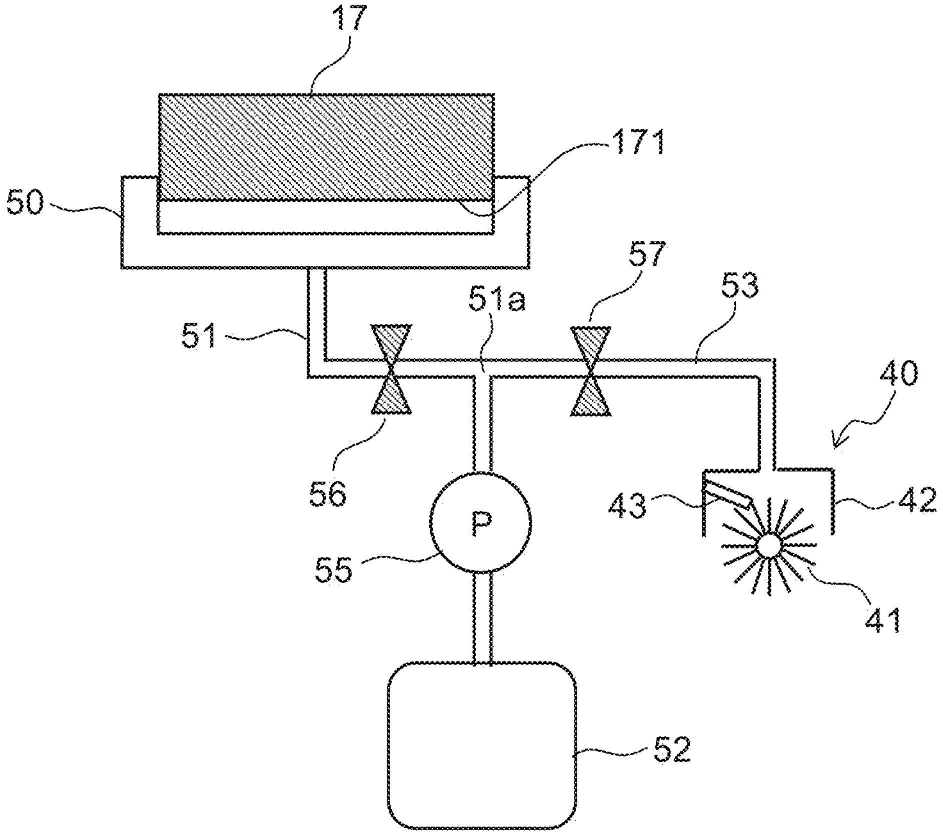
FIG. 4 is a schematic configuration diagram showing the suction passage of a suction pump connected to a static eliminating device and to a cap attached to a recording head in the printer according to the embodiment.

FIG. 4 is a schematic configuration diagram showing the suction passage of the suction pump 55 connected to the static eliminating device 40 and to the cap 50 attached to the recording head 17 in the printer 100. In the following description, the recording heads 17*a* to 17*c* are collectively referred to as the recording head 17.

The cap 50 is attached to the recording head 17. The cap 50 is supported on the cap portion 20 (see FIG. 1) and is attached to the ink discharge surface (nozzle surface) 171 of the recording head 17 when no printing process is performed for a certain period of time or longer. With the cap 50 attached, the ink discharge surface 171 of the recording head 17 is kept hermetically sealed. An ink discharge passage 51 is connected to the cap 50.

Through the ink discharge passage 51, the inside of the cap 50 communicates with the waste ink collection container 52. The paper dust suction passage 53 is connected to a joint portion 51*a* of the ink discharge passage 51. Through the paper dust suction passage 53, the inside of the duct 42 of the static eliminating device 40 communicates with the ink discharge passage 51.

A suction pump 55 is connected downstream of the joint portion 51*a* with respect to the ink discharge direction (direction from the recording head 17 to the waste ink collection container 52) in the ink discharge passage 51. A first on-off valve 56 is disposed between the recording head 17 and the joint portion 51*a*. The first on-off valve 56 opens and closes the ink discharge passage 51 between the recording head 17 and the suction pump 55 according to a control signal from the control device 110 (see FIG. 5).

A second on-off valve 57 is disposed between the static eliminating device 40 and the joint portion 51*a*. The second on-off valve 57 opens and closes the paper dust suction passage 53 according to a control signal from the control device 110.

In order to remove dried and thickened ink, foreign matter, and the like in the ink ejection apertures 18 (see FIG. 2) in the recording head 17, the printer 100, at the start of printing after a long period of disuse and between sessions of printing operation, performs a suction purge process in which, with the cap 50 attached to the ink ejection surface 171, the air in the space (hermetic space) between the ink ejection surface 171 and the cap 50 is sucked to forcibly suck out ink from all the ink ejection apertures 18 in the recording head 17 in preparation for the subsequent printing operation. The ink sucked out from the recording head 17 into the cap 50 (purged ink) is discharged out of the cap 50 by the suction pump 55 and is then collected in the waste ink collection container 52 via the ink discharge passage 51.

3. Control Paths in the Printer

Figure 5:
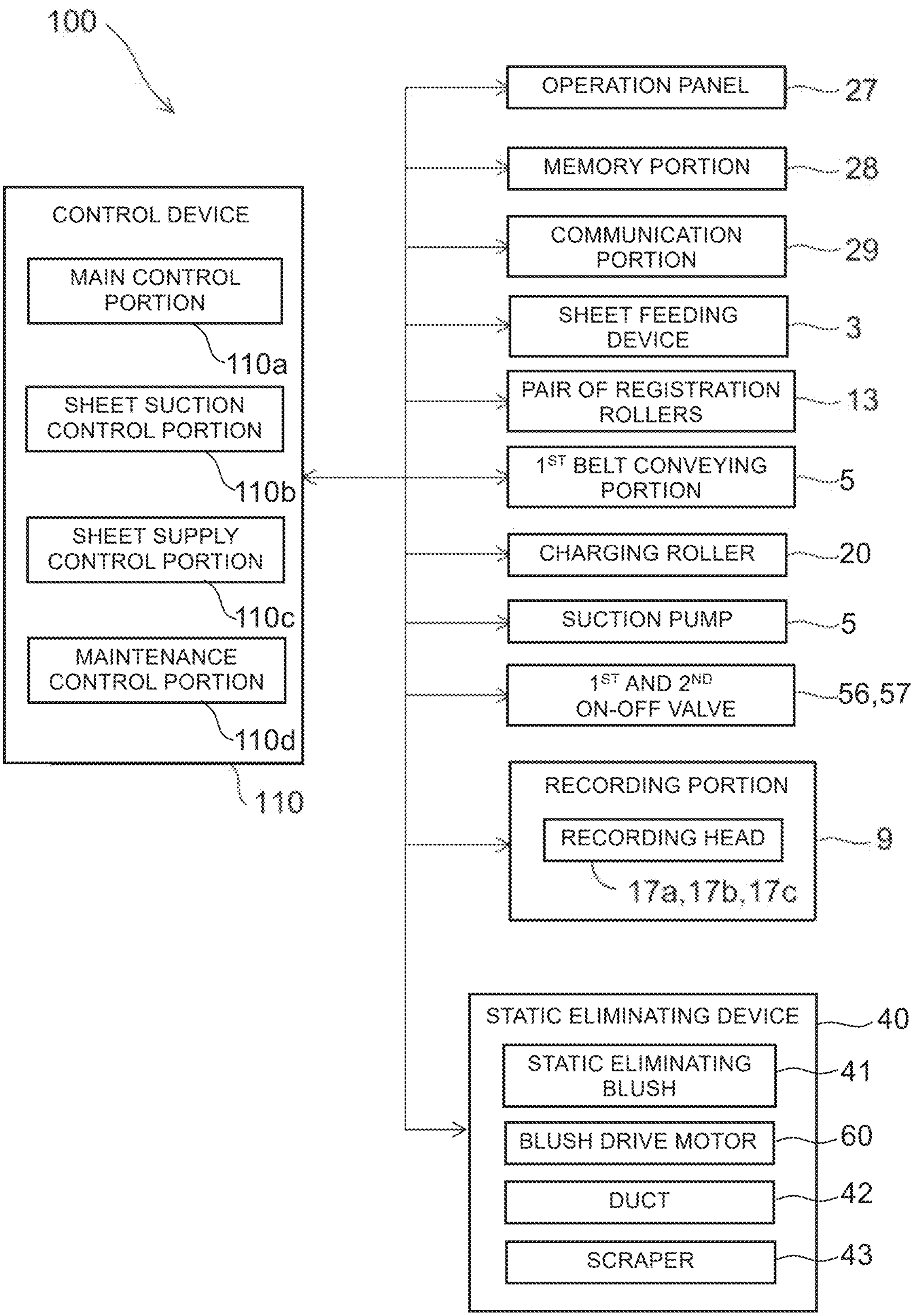
FIG. 5 is a block diagram showing an example of control paths in the printer according to the embodiment.

FIG. 5 is a block diagram showing an example of control paths in the printer 100. In addition to the components mentioned above, the printer 100 further includes an operation panel 27, a memory portion 28, a communication portion 29, and the brush drive motor 60.

The operation panel 27 is a control portion that accepts the input of various settings. For example, the user can operate the operation panel 27 to enter information on the size of the sheet P to be set on the sheet feed cassette 2*a* or a manual sheet feed tray 2*b*, that is, the size of the sheet P to be conveyed on the first conveyance belt 8. The user can also operate the operation panel 27 to enter the number of sheets P to be printed or to request to start a print job. The operation panel 27 also functions as a notification device notifying the user about the operating status of the printer 100.

The memory portion 28 is a memory that stores an operating program for the control device 110 as well as various kinds of information, and includes a ROM (read-only memory), a RAM (random-access memory), a non-volatile memory, and like. The information set on the operation panel 27 is stored in the memory portion 28.

The communication portion 29 is a communication interface that transmits and receives information to and from an external device (e.g., a personal computer). For example, when a user operates the PC and transmits a print command (print instruction) together with image data to the printer 100, the image data and the print command are fed to the printer 100 via the communication portion 29. In the printer 100, the main control portion 110*a* controls the recording heads 17*a* to 17*c* to eject ink based on the image data, thereby recording an image to the sheet P.

The brush drive motor 60 rotates the static eliminating brush 41 (see FIG. 3) at a predetermined rotation speed based on a control signal transmitted from the main control portion 110*a*.

In this embodiment, the printer 100 includes the control device 110. The control device 110 is configured with a CPU (central processing unit) and a memory. Specifically, the control portion 110 has a main control portion 110*a*, a sheet suction control portion 110*b*, a sheet feed control portion 110*c* and a maintenance control portion 110*d*.

The main control portion 110*a* controls the operation of different parts in the printer 100. For example, the driving of the rollers in the printer 100, the ejection of ink from the recording heads 17*a* to 17*c* during image recording, and the like are controlled by the main control portion 110*a*. The main control portion 110*a* also drives the suction device 70 to remove paper dust from the sheet P conveyed to the recording portion 9.

The sheet attraction control portion 110*b* transmits a control signal to the attraction voltage power supply 21 to apply a voltage to the charged roller 20 to electrostatically attract the sheet P onto the first conveyance belt 8.

The sheet supply control portion 110*c* is a recording medium supply control portion that controls the pair of registration rollers 13 as a recording medium supply portion. For example, the sheet supply control portion 110*c* controls the conveyance timing of the subsequent sheet P by controlling the pair of registration rollers 13 based on the detection timing of the trailing end of sheet P by a sheet detection sensor (not shown).

The maintenance control portion 110*d* performs control to make the recording heads 17*a* to 17*c* perform the purging described above to forcibly push ink out of the ink ejection nozzles 18. When making the recording heads 17*a* to 17*c* perform purging, the maintenance control portion 110*d* also controls the driving of the maintenance portion 19 (e.g., to move it to and from below the recording portion 9) as described above.

The control portion 110 can further include an arithmetic portion that performs the necessary calculations and a time counting portion that counts time. The main control portion 110*a* can serve also as the just-mentioned arithmetic and time counting portions.

4. Static Eliminating Operation Performed During Printing Operation of the Printer As described above, during static elimination with the static eliminating brush 41 rotating while in contact with the sheet P, paper dust is produced by the static eliminating brush 41 as it rubs the surface of the sheet P. This paper dust clogs the ink ejection apertures 18 in the recording head 17 and causes failure of ink ejection from the ink ejection apertures 18 (missing pins), inconveniently degrading image quality.

To cope with that, in the printer 100 according to the embodiment, the suction pump 55 used in the suction purge process for the recording head 17 is disposed to communicate with the duct 42 of the static eliminating device 40, and the paper dust produced in the static eliminating device 40 is sucked and removed by the suction pump 55. Moreover, the rotation speed of the static eliminating brush 41 is controlled to suppress production of paper dust.

Figure 6:
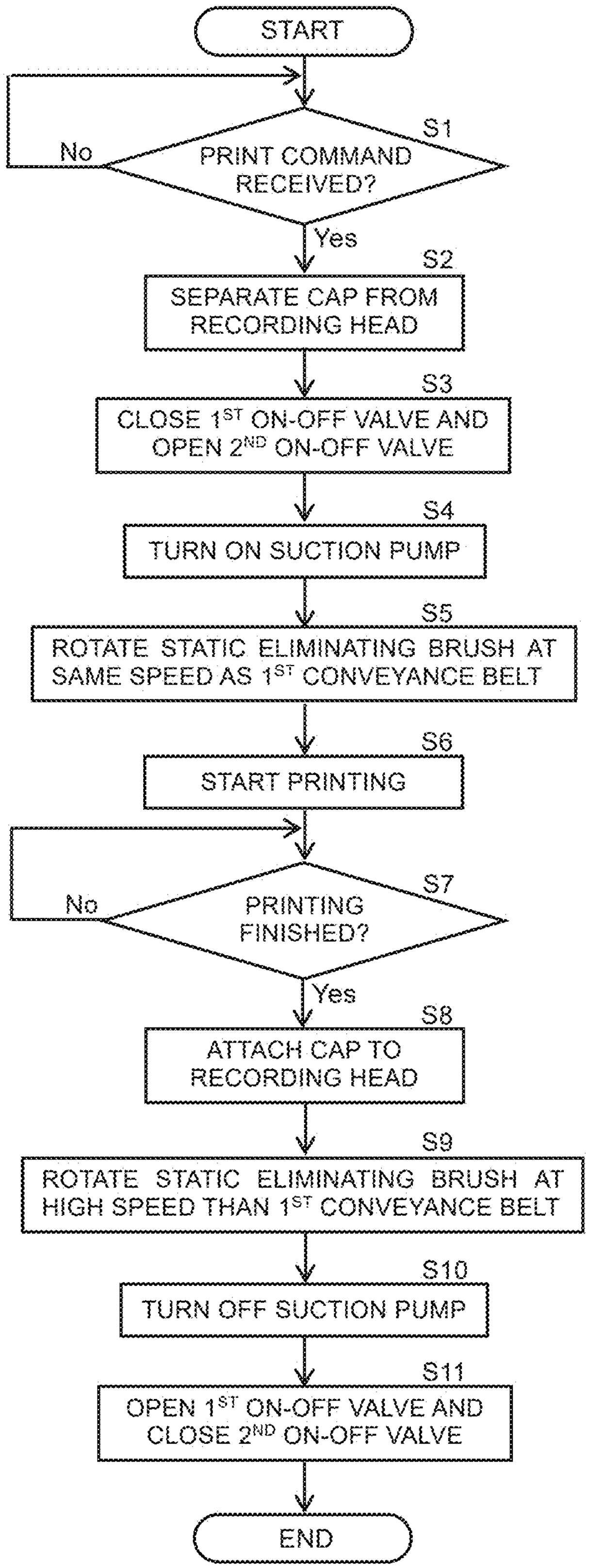
FIG. 6 is a flowchart showing the static eliminating operation and the paper dust removal operation performed during printing on the printer according to the embodiment.

FIG. 6 is a flowchart showing the static eliminating operation and the paper dust removal operation performed during printing on the printer 100. The operation of the suction pump 55 and the first and second on-off valves 56 and 57 during printing operation on the printer 100 will now be described along the steps in FIG. 6 with reference also to FIGS. 1 to 5 as necessary.

First, the control device 110 checks whether the communication portion 29 has received a print command from a host device such as a personal computer (step S1). If no print command has been received (No in step S1), a print standby state continues.

If a print command has been received (Yes in step S1), the control portion 110 starts print preparation operation. Specifically, according to a control signal from the main control portion 110*a*, the first conveyance belt 5 starts to be driven to rotate. Then, according to a control signal from the sheet attraction control portion 110*b*, a predetermined voltage is applied from the attraction voltage power supply 21 to the charging roller 20 to electrostatically charge the first conveyance belt 8.

Next, the main control portion 110*a* separates the cap 50 from the recording head 17 (step S2). Then, the first on-off valve 56 is closed and the second on-off valve 57 is opened (step S3) to open the paper dust suction passage 53. In this state, the suction pump 55 is turned on (step S4), and the static eliminating brush 41 is rotated at the same speed as the first conveyance belt 5 (step S5).

Next, the main control portion 110*a* starts printing operation (step S6). Specifically, according to a control signal from the sheet supply control portion 110*c*, a sheet P is conveyed from the pair of registration roller 13 to the first belt conveyance portion 5 with predetermined timing. According to the image data received along with the print command, the main control portion 110*a* ejects ink from the recording head 17 onto the sheet P passing below the recording portion 9 to record an image.

Next, the main control portion 110*a* checks whether printing has been finished (step S7). If printing is continuing (No in step S7), the printing operation described above is repeated. If printing has been finished (Yes in step S7), the main control 110*a* attaches the cap 50 to the recording head 17 (step S8).

Next, the control device 110 starts paper dust removal operation for the first conveyance belt 5. Specifically, the static eliminating brush 41 is rotated at a higher speed than the first conveyance belt 8 (step S9) to scrape off the paper dust adhering to the first conveyance belt 8 with the static eliminating brush 41 (foreign matter removal operation). The paper dust adhering to the static eliminating brush 41 is scraped off by the scraper 43. The paper dust scraped off from the first conveyance belt 8 and the static eliminating brush 41 is sucked by the suction pump 55 and collected in the waste ink collection container 52 via the duct 42 and the paper dust suction passage 53. The first conveyance belt 5 and the static eliminating brush 41 stop rotating after a predetermined time.

The suction pump 55 is then turned off (step S10), and the first on-off valve 56 is opened and the second on-off valve 57 is closed in preparation for the suction purge process (step S11).

According to the control example shown in FIG. 6, the static eliminating brush 41 is rotated at the same speed as the first conveyance belt 8 during printing operation. This suppresses the rubbing of the surface of the sheet P by the static eliminating brush 41. In this way, static elimination for the sheet P can be performed without generating unnecessary paper dust. Moreover, by performing, after printing operation, paper dust removal operation in which the static eliminating brush 41 is rotated at a higher speed than the first conveyance belt 8, the paper dust adhering to the conveyance surface of the first conveyance belt 8 can be efficiently removed.

The paper dust resulting from rubbing between the static eliminating brush 41 and the sheet P and the paper dust removed from the first conveyance belt 8 by the static eliminating brush 41 is sucked using the suction pump 55 for the suction purge process for the recording head 17. This eliminates the need to provide a separate pump for sucking paper dust and thus helps reduce the number of components and the cost of the printer 100.

The embodiment described above are not meant to limit the scope of the present disclosure, which thus allows for any modifications without departure from the scope of the present disclosure. For example, the embodiment described above deals with an example where, as an inkjet recording apparatus, a printer 100 that records color images using ink of four colors is used, but the present disclosure can be applied quite equally to monochrome printers that record monochrome images using black ink.

Moreover, while the embodiment described above deals with, as an inkjet recording apparatus, a line-head type printer 100 that performs recording using line heads 11C to 11K provided with recording heads 17*a* to 17*c* with a large number of ink ejection nozzles 18 lined up along the sheet width direction, the present disclosure can be applied quite equally to a serial type inkjet recording apparatus in which recording heads 17 perform recording while scanning a sheet.

The present disclosure finds applications in inkjet recording apparatuses that record by ejecting ink from ink ejection nozzles provided in a recording head. Based on the present disclosure, it is possible to provide an inkjet recording apparatus that can effectively reduce clogging of nozzles and contamination of a conveyance belt due to paper dust generated when a sheet is conveyed by an electrostatic attraction method.

What is claimed is:

1. An inkjet recording apparatus comprising:

a conveyance portion that conveys a sheet while electrostatically attracting the sheet onto a conveyance belt that is endless;

a recording portion that has a recording head disposed opposite a conveyance surface of the conveyance belt, the recording portion discharging ink from an ink ejection aperture in the recording head onto the sheet conveyed by the conveyance belt;

a cap that is attached to an ink ejection surface of the recording head to form a hermetic space between the cap and the ink ejection surface;

a suction pump that sucks air inside the cap; and a static eliminating device that is disposed upstream of the recording portion with respect to a conveyance direction of the sheet, the static eliminating device removing electrical charge from the sheet; and a control portion that controls operation of the conveyance portion, the recording portion, the suction pump, and the static eliminating device, wherein the static eliminating device includes:

a roll-form static eliminating brush that is disposed opposite the conveyance belt over an entire region thereof in a width direction orthogonal to the conveyance direction, the static eliminating brush contacting the sheet conveyed by the conveyance belt;

a brush drive motor that makes the static eliminating brush rotate in a forward direction with respect to a movement direction of the conveyance belt;

a duct that covers a side of the static eliminating brush opposite from the conveyance belt, the duct sucking foreign matter produced from contact between the static eliminating brush and the sheet or the conveyance belt; and a scraper that protrudes from an inner surface of the duct to contact the static eliminating brush, the scraper scraping off the foreign matter adhering to the static eliminating brush, and the inkjet recording apparatus further comprises a foreign matter suction passage through which the duct and the suction pump communicate with each other, the inkjet recording apparatus collecting the foreign matter in the duct using the suction pump and the foreign matter suction passage.

2. The inkjet recording apparatus of claim 1, wherein the foreign matter suction passage joins an ink discharge passage upstream of the suction pump with respect to a discharge direction of a liquid, the inkjet recording apparatus further comprises:

a first on-off valve that opens and closes the ink discharge passage between the cap and the suction pump; and a second on-off valve that opens and closes the foreign material suction passage between the duct and the suction pump, during image recording to the sheet, the control portion closes the first on-off valve and, with the second on-off valve open, drives the suction pump to collect the foreign matter in the duct, and otherwise than during image recording to the sheet, the control portion can perform a suction purge process by attaching the cap to the ink discharge surface, opening the first on-off valve, and, with the second on-off valve closed, driving the suction pump to suck air in the hermetic space.

3. The inkjet recording apparatus of claim 1, wherein the control portion controls driving of the brush drive motor to rotate the static eliminating brush at a same speed as a movement speed of the conveyance belt during image recording to the sheet.

4. The inkjet recording apparatus of claim 1, wherein the control portion controls driving of the brush drive motor to perform foreign matter removal operation in which the static eliminating brush is rotated at a higher speed than a movement speed of the conveyance belt after image recording to the sheet.

5. The inkjet recording apparatus of claim 1, further comprising:

a suction roller that is disposed upstream of the static eliminating device with respect to the conveyance direction and that presses the sheet onto the conveyance belt.

* * * * *